(12) United States Patent
Sharma et al.

(10) Patent No.: US 10,460,481 B2
(45) Date of Patent: Oct. 29, 2019

(54) SHAPE BUILDING IN A DIGITAL MEDIUM ENVIRONMENT

(71) Applicant: Adobe Inc., San Jose, CA (US)

(72) Inventors: Avadhesh Kumar Sharma, Jhunjhunu (IN); Ankit Phogat, Bhiwani (IN); Akhil Jindal, Delhi (IN)

(73) Assignee: Adobe Inc., San Jose, CA (US)

( * ) Notice: Subject to any disclaimer, the term of this patent is extended or adjusted under 35 U.S.C. 154(b) by 81 days.

(21) Appl. No.: 15/349,833

(22) Filed: Nov. 11, 2016

(65) Prior Publication Data

US 2018/0137659 A1 May 17, 2018

(51) Int. Cl.
*G06T 11/20* (2006.01)
*G06T 11/60* (2006.01)
*G06T 11/40* (2006.01)
*G06F 3/0484* (2013.01)

(52) U.S. Cl.
CPC ............ *G06T 11/203* (2013.01); *G06T 11/40* (2013.01); *G06T 11/60* (2013.01); *G06F 3/04845* (2013.01)

(58) Field of Classification Search
CPC .................. G06T 11/203; G06T 11/60; G06T 2207/20221; G06T 2210/21; G06F 3/04845; G06F 3/0487
See application file for complete search history.

(56) References Cited

U.S. PATENT DOCUMENTS

2006/0085767 A1* 4/2006 Hinckley ............ G06F 3/04883
715/863
2013/0311954 A1* 11/2013 Minkkinen ......... G06F 3/04812
715/862

OTHER PUBLICATIONS

Christian Krammer, "Sketch tip: How boolean operations work", post on Mar. 18, 2016. https://medium.com/sketch-app-sources/the-way-boolean-operations-work-69c183082427.*

* cited by examiner

*Primary Examiner* — Chong Wu
(74) *Attorney, Agent, or Firm* — SBMC

(57) ABSTRACT

Shape building within a digital medium environment is described. In an implementation, a relationship is detected of a user input as drawn within a user interface with respect at least one shape displayed within the user interface. Based on this relationship, a shape building operation is identified from a plurality of shape building operations. The relationship is also used to determine at least one shape that is to be subject of the identified shape building operation. From this the identified shape building operation is performed on the identified at least one shape and a result of the performance of the shape building operation is output in the user interface.

20 Claims, 11 Drawing Sheets

SHAPE BUILDING IN A DIGITAL MEDIUM ENVIRONMENT

BACKGROUND

Shape building is one of the primary techniques used to create illustrations in digital content. A user, for instance, may interact with an illustration processing system of a computing device to build shapes to create icons, logos, and so forth. Shapes may take a variety of forms, such as rectangles, circles, ovals, stars, polygons, and so forth.

Operations may also be supported by the illustration processing system to process these shapes to form even more complex shapes. In one example, a merge operation is performed by the computing device to combine two or more shapes into a single shape in a user interface, e.g., to combine two circles and a rectangle to form a barbell shape. In another example, a delete operation is performed by the computing device to remove all or a portion of a shape within the user interface, e.g., to remove a non-overlapping portion of a first shape with respect to a second shape to form a multi-colored first shape. In a further example, a punch out operation is performed to remove an interior portion (i.e., "fill") of a shape such that a background of the digital content is viewable through that portion.

Conventional techniques used to initiate and perform these operations, however, involve a multi-step workflow that may be difficult to understand and implement by casual users. For example, conventional techniques require the user to explicitly indicate the particular operation to be performed. This is performed in conventional techniques through use of a unique key combination or by first locating a representation of the operation in a menu in a user interface and then selecting the representation. These conventional techniques also require the user to separately indicate which shape or shapes in the user interface are to be subject to the indicated operation, e.g., by then selecting shapes by "clicking" or "circling" the shapes in a user interface. After receipt of this series of separate inputs from the user, the computing device then performs the operation. Thus, these conventional techniques typically require the user to perform a series of steps that involve specialized knowledge (e.g., the key combination) or require the user to navigate back and forth between the digital content and the menu, which is inefficient and potentially frustrating to the user.

Further, conventional techniques to perform these operations break definitions of constituent shapes involved in the operation to define a single resulting shape. For example, a delete operation may be performed to remove a portion of a first shape that does not intersect a second shape, thereby leaving the intersecting portion of the first shape and the second shape in the user interface. In a conventional delete operation, however, the second shape and the intersecting portion are then defined as a single shape in the user interface as a result of this operation. Consequently, this conventional delete operation prevents the user from interacting with the computing device to further modify the constituent shapes, separately, using these operations but rather is limited to interaction with the single resulting shape. The user, for instance, is not provided with an ability to interact with the second shape and the intersecting portion separately and thus is limited from use of further operations in conventional shape building techniques.

SUMMARY

Shape building techniques and systems in a digital medium environment are described that can overcome the limitations of conventional techniques described above. These shape building operations leverage a single user input to both identify one of a plurality of shape building operations as well as a subject of the identified shape building operation. This permits a user to efficiently and intuitively interact with a computing device to build shapes in digital content.

In an implementation, a single user input drawn in a user interface is used to initiate a shape building operation by a computing device based on a relationship of the user input with respect to at least one shape in the user interface. Thus, the relationship identifies the shape building operation and a subject shape on which to perform the operation. In a merge operation, a user input is detected by the computing device that involves drawing a freeform line through a border between two shapes. From this, the computing device identifies a merge operation as well as what shapes are to take part of the merge operation. Performance of the merge operation by the shape builder module causes the two shapes to have the same appearance, e.g., same fill, border, and so forth, and appear as a single shape in digital content.

In a delete operation, a user input is detected by the computing device that involves drawing a freeform line through at least a portion of a shape. The user input, as drawn, also includes an exterior of the shape that is not disposed over any other shape in the user interface, e.g., is disposed over a background of the digital content. From this, the shape builder module of the computing device identifies a delete operation as well as what shape, shapes, and/or portions of the shapes are to take part of the delete operation. The shape builder module then removes the shape, shapes, and/or portions of the shapes from the user interface by performing the delete operation.

In a punch out operation, a user input is detected by a computing device that involves drawing a freeform line entirely within a border of the shape in a user interface, e.g., a scribble within a fill area of the shape. From this, the shape builder module of the computing device identifies a punch out operation as well as what shape, shapes, or portion of the shapes are involved in performing the punch out operation. Performance of the punch out operation by the computing device causes removal of a fill of a corresponding portion of the shape, shapes, or portions of the shapes. Accordingly, a single user input may be used to identify a particular one of a plurality of shape building operations as well as a shape, shapes, or portions of the shapes are to be a subject of the operation through direct interaction with the shapes within the user interface in an intuitive and efficient manner.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
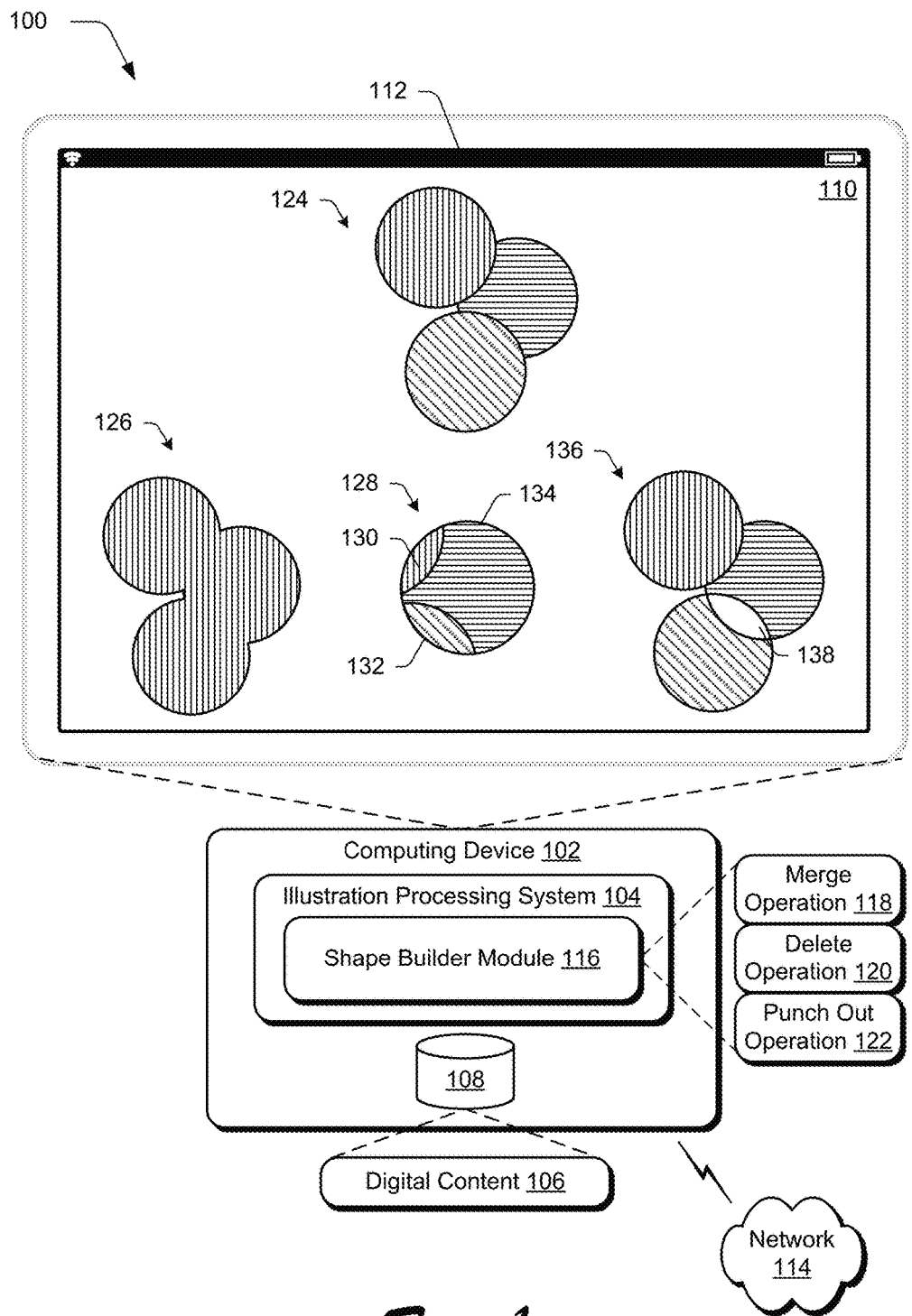
FIG. 1 is an illustration of an environment in an example implementation that is operable to employ shape building techniques described herein.

Conventional shape building operations used as part of creating digital content require user interaction as part of a multi-step workflow and thus are inefficient and often depart from a user's expectations in how shapes are built in the real world. Further, conventional techniques also combine definitions of constituent shapes that are subject to the operation into a single shape definition and thus limit an ability to further modify the shape using these operations.

Shape building techniques and systems in a digital medium environment are described. These techniques leverage a user input drawn in a user interface (e.g., as a freeform line) to initiate a shape building operation based on a relationship of the user input with respect to at least one shape in the user interface. The user, for instance, may draw a freeform line in the user interface through use of a gesture (e.g., detected using touchscreen functionality or a trackpad) or a cursor control device, e.g., drawn through use of a mouse. Other non-freeform techniques are also contemplated, such as through use of a line drawing tool, a bounding box, and so forth. A relationship of this user input to a shape or a plurality of shapes is then used to identify a shape building operation to be performed. The relationship is also used to determine shape, shapes, or portions of the shapes are subject of the operation, i.e., are the target of the identified shape building operation. In this way, a single user input may be leveraged to define both the shape building operation and a subject of the shape building operation in an efficient and intuitive manner.

In a merge operation, for instance, a user input is detected by a computing device that involves drawing a freeform line through a border between two shapes, e.g., as a squiggly line across the border that includes interior portions of both shapes. Thus, the user input defines a relationship that includes the two shapes and a corresponding border. From this, a shape builder module of the computing device identifies a merge operation as well as what shapes are to take part of the merge operation. Performance of the merge operation by the shape builder module causes the two shapes to have the same appearance (e.g., the same fill, texture, border, and/or color) and may also be used to remove a portion of the border between the two shapes in the user interface. The appearance used for both shapes, for instance, may be based on a location at which the user input is initiated in this user interface, e.g., which shape interior is used to begin the drawing of the line. The appearance of that shape is then applied such that both shapes share the same appearance. In this way, the user may provide a single, simple, and intuitive user input that does not involve key combinations or menu navigation and thus has improved efficiency over conventional shape building techniques.

In another instance, a user input is detected that involves drawing a freeform line through at least a portion of a shape and through an exterior of the shape that is not disposed over any other shape in the user interface, e.g., is disposed over a background of the digital content. From this, the shape builder module of the computing device identifies a delete operation as well as what shape, shapes, and/or portions of the shapes are to take part of the delete operation.

For example, the freeform line may be drawn over a portion of a shape that does not intersect (e.g., does not overlap) another shape in the user interface. This freeform line is also drawn at least partially outside of a border of the portion of the shape, e.g., over a background of the digital content. The shape builder module may thus identify that a delete operation is desired (by drawing the line as least partially over the background) as well as determine a portion of the shape that is subject to this operation. In this example, this causes the non-intersecting portion of the shape to be deleted such that the intersecting portion remains in the user interface. Thus, by drawing at least a portion of the freeform line outside of a border of the shape, the shape builder module may differentiate the delete operation from the merge operation described above.

In another instance, a user input is detected that involves drawing a freeform line entirely within a portion of a shape (e.g., within a border of the shape) in a user interface, e.g., a scribble within a fill area of the shape. From this, the shape builder module of the computing device identifies a punch out operation as well as what shape or portion of the shape is involved in performing the punch out operation.

In one example of a punch out operation, the freeform line is drawn within an intersecting portion of a first shape with a second shape, i.e., a portion of the first shape that is disposed over the second shape in the user interface. The shape builder module, in response, identifies the portion involved from both shapes as well as the punch out operation. This identification is based on a determination by the shape builder module that the freeform line is not drawn over a border of either shape. Performance of the punch out operation by the shape builder module causes the portions from both shapes to be removed from the user interface, e.g., such that an underlying background may be viewed through that portion. Thus, a relationship defined by drawing the freeform line entirely within a border of the shape may be used to identify the punch out operation and to differentiate this operation from the delete operation and the merge operation described above that involve drawing over a border of a shape. Accordingly, a single, simple, and intuitive user input may be used to initiate a corresponding one of a plurality of shape building operations through direct interaction with the shapes within the user interface to create digital content. Further discussion of these and other examples of shape building operations is included in the following sections.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including an illustration processing system 104. The illustration processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the illustration processing system 104 may also be implemented as whole or part via functionality available via the network 114, such as part of a web service or "in the cloud."

An example of functionality incorporated by the illustration processing system 104 to process the digital content 106 is illustrated as a shape builder module 116. The shape builder module 116 is implemented at least partially in hardware of the computing device 102 (e.g., through use of a processing system and computer-readable storage media) to identify shape building operations and portions of a shape, shapes, or portions of shapes that correspond to the shape building operations. To do so, the shape builder module 116 determines a relationship of a user input drawn in the user interface 110 to a shape, shapes, and/or portions of shapes included in the user interface 110. This relationship identifies and differentiates the shape building operation from a plurality of shape building operations and also identifies a shape or shapes that are a subject of the operation.

Illustrated examples of shape building operations include a merge operation 118, a delete operation 120, and a punch out operation 122. The merge operation 118, as illustrated in the user interface 110, causes a collection of shapes 124 to be merged together to have a similar appearance as a single resulting merged shape 126, e.g., have the same "fill" and style of border. Performance of the delete operation 120 by the shape builder module 116 causes removal of portions of the collection of shapes 124 from the user interface 110 to leave a result 128 that includes portions 130, 132 of the shapes as well as another shape 134 that are not involved in the operation. The punch out operation 122 forms a result 136 in which an interior portion 138 of one or more shapes is removed, e.g., to show a background of the user interface 110. Operation of the shape builder module 116 is described in greater detail in relation to FIG. 2 in the following description and shown is corresponding user interfaces of FIGS. 4-10.

Identification and Initiation of Shape Building Operations

Figure 2:
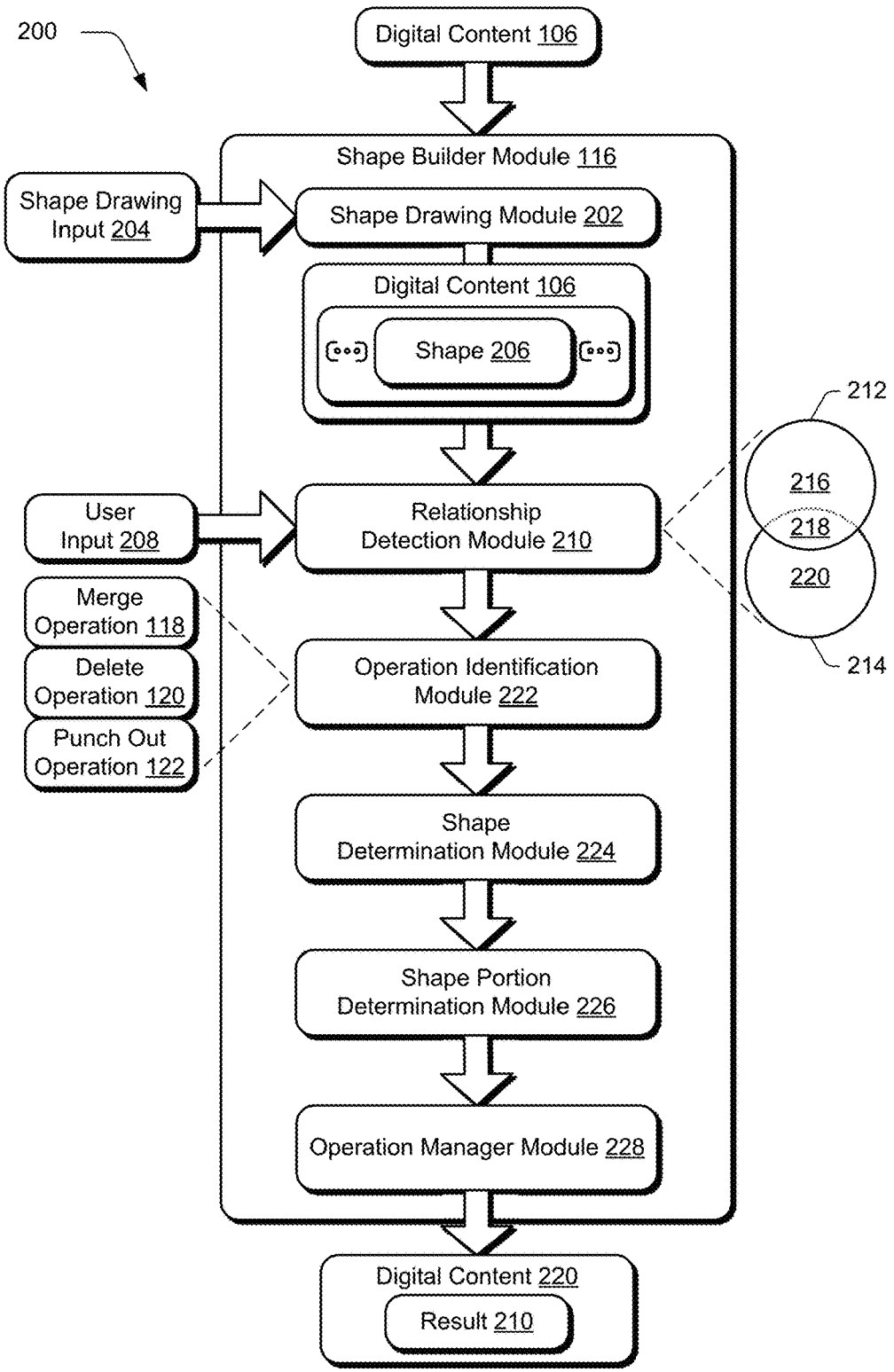
FIG. 2 depicts a system in an example implementation in which operation of a shape builder module of FIG. 1 is shown in greater detail as identifying a shape building operation and a portion of a shape that is a subject of the operation based on a single user input.
Figure 3:
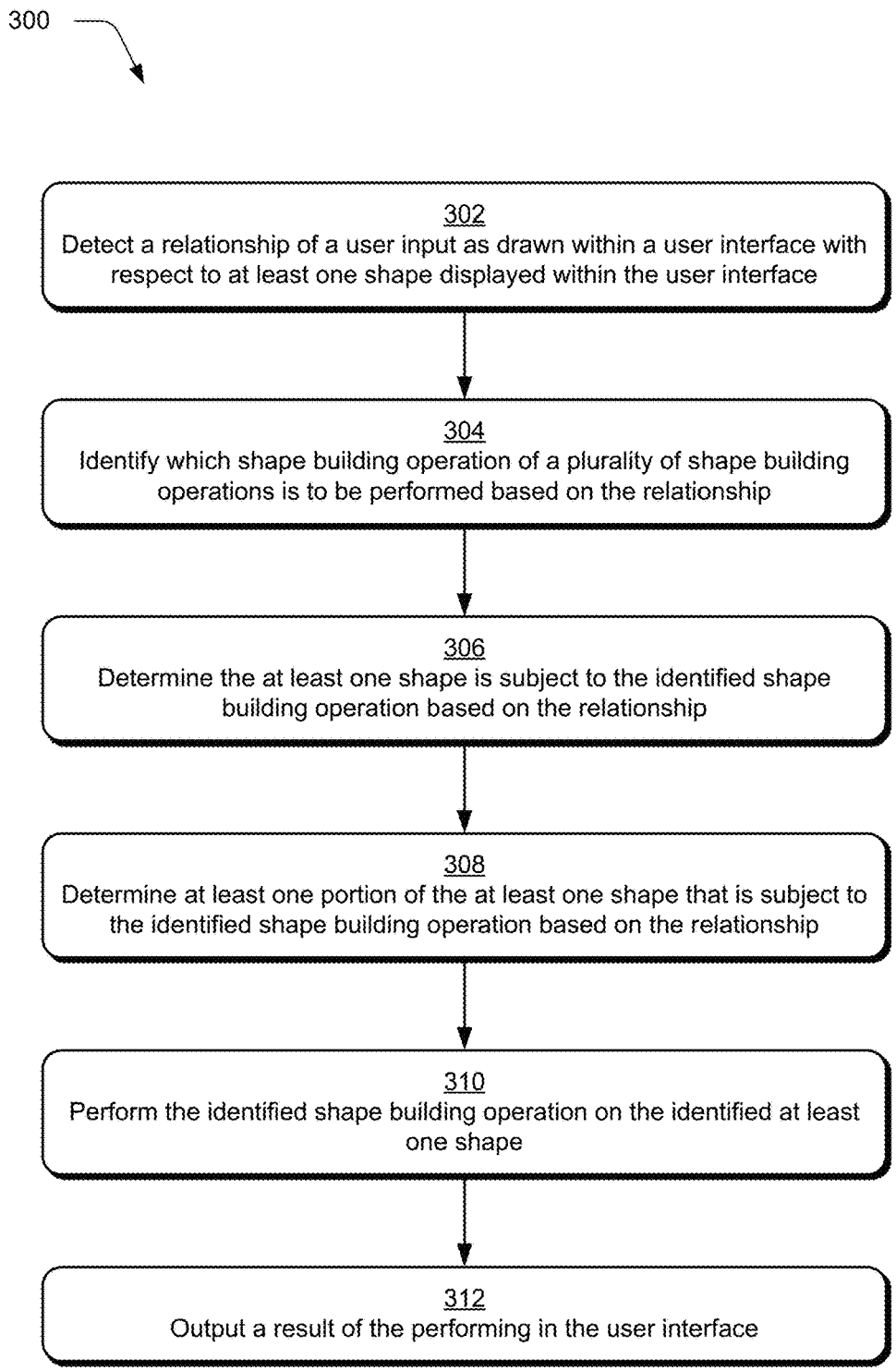
FIG. 3 is a flow diagram depicting a procedure in an example implementation in which both a shape building operation and a portion of a shape that is a subject of the operation are identified based on a single user input.

FIG. 2 depicts a system 200 in an example implementation in which operation of a shape builder module 116 of FIG. 1 is shown in greater detail as identifying a shape building operation and a portion of a shape that is a subject of the operation based on a single user input. FIG. 3 depicts a procedure 300 in an example implementation of identifying a shape building operation and a portion of a shape that is a subject of the operation based on a single user input. FIGS. 4-10 depict examples of different shape building operations.

In general, functionality, features, and concepts described in relation to the examples above and below may be employed in the context of the example procedure described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

The shape builder module 116 in this example is incorporated as part of a system to create digital content 106 by building shapes within the digital content 106. To begin, a shape drawing module 202 is implemented at least partially in hardware of the computing device 102 receives one or more shape drawing inputs 204 from a user to form shapes 206 within the digital content 106. A user, for instance, may interact with a user interface and select from different options of preconfigured shapes 206 to be drawn in the user interface (e.g., simple shapes such as circle, rectangle, or oval or complex shapes like polygons or stars), fill of those shapes 206, style of border, location and size of the shapes 206 in the user interface, and so forth.

Shape building operations may also be performed to form shapes having increased complexity than preconfigured options made available by the shape builder module 116. To do so in this example, user inputs 208 are received that involve direct interaction of a user with the user interface 110. This is contrasted with conventional techniques that require navigation through menus to locate a representation of a particular shape building operation, select the shape that is to be the subject of the operation, and then initiate the operation.

The user, for instance, may originate a user input 208 through interaction with the user interface 110 of FIG. 1. This may include a freeform user input, such as line that is not constrained to a particular shape, or through a selection tool, such as a line drawing tool, bounding box using a "click and drag" operation, and so forth. Consequently, the user input 208 may be detected by the computing device 102 in a variety of ways, such as through use of a cursor control device, touchscreen functionality, a gesture, use of a stylus, and so forth.

A relationship is detected of a user input 208 as drawn within a user interface with respect at least one shape displayed within the user interface (block 302). A relationship detection module 210, for instance, is implemented at least partially in hardware of a computing device 102 to determine a relationship of the user input 208 with respect to shapes 212, 214 in a user interface. In an implementation, this relationship is determined with respect to constituent shapes (actual shape definitions used to define what is rendered) as defined in the user interface and not limited to what is viewable by a user in a user interface, e.g., through overlap of shapes.

Use of constituent shape definitions may be used to support expanded shape building functionality. In one example, the relationship detection module 210 first segments each of the shapes 212, 214 based on intersection (e.g., overlap) of these shapes 212, 214 with each other. In the illustrated instance, shape 212 is disposed over shape 214 in a user interface. This intersection may be leveraged by the relationship detection module 210 to define portions 216, 218, 220 from the shapes 212, 214. In this way, shape building operations may be performed using these portions 216, 218, 220 and are not limited to interaction with the shapes 212, 214 as a whole.

An identification is then made as to which shape building operation of a plurality of shape building operations is to be performed based on the relationship (block 304). The user input 208, for instance, may be input as a freeform line (a "squiggle") in the user interface 110, e.g., as a gesture, through use of a cursor control device, and so forth. A relationship of this user input 208 to a shape, shapes, and/or portions of shapes (e.g., as a result of segmentation above) is then used by an operation identification module 222 (implemented at least partially in hardware of a computing device 102) to identify which shape building operation is desired by a user that provided the input.

The relationship of the user input 208 to a shape may be used to differentiate between a plurality of shape building operations and thus identify which shape building operation is desired by a user. Examples of shape building operations include a merge operation 118, a delete operation 120, and a punch out operation 122. If the user input 208, for instance, is disposed over at least a portion of a border between two shapes and within a fill of the shapes, the shape building operation is identified by the operation identification module 222 as a merge operation 118 as further described in relation to FIGS. 4-5. In another instance, if the user input 208 is disposed over a portion of the user interface 110, at least partially, that does not include a shape then the operation identification module 222 identifies the shape building operation as a delete operation 120 as further described in relation to FIGS. 6-7. In a further example, if the user input is disposed entirely within a border of a shape 212, 214 or portion of a shape 216, 218, 220, the operation identification module 222 identifies the user input 208 as corresponding to a punch out operation 122 as further described in relation to FIGS. 8-9.

A determination is also made, based on the relationship, that the at least one shape is subject to the identified shape building operation (block 306). Continuing with the previous example, the freeform output may be disposed at least partially over a shape in the user interface. From this, the shape determination module 224 may determine that shape in the user interface is a subject of the identified shape building operation. In this way, a single user input 208 (e.g., a single drawn freeform line in a user interface 110) may be used to both identify the shape building operation and a shape that is subject to the shape building operation.

The shape determination module 224, for instance, may convert the user input 208 into one or more Bezier curves. A Bezier curve employs at least three points to define a curve. Endpoints of the curve are called anchor points with interior points on the curve used to define a shape of the curve. A determination is then made by the shape determination module 224 as to which shapes included in the user interface 110 underlie this Bezier curve, i.e., are disposed "underneath" the curve in the user interface. As previously described, this determination may be performed based on definitions of constituent shapes in the user interface (an actual mathematical definition and not just "what is seen" by a user) and thus may include shapes that are overlapped by other shapes in the user interface 110.

A determination is also made that as least one portion of the at least one shape is subject to the identified shape building operation based on the relationship (block 308). A shape portion determination module 226, for instance, may also determine which portions 216, 218, 220 of shapes 212, 214 are overlapped by the Bezier curve representation of the user input 208. To do so, the shape portion determination module 226 may form a plurality of portions 216, 218, 220 from the shapes 212, 214 based on intersection of those shapes 212, 214 with each other as previously described. The portions 216, 218, 220, for instance, may be defined based on interior (e.g., fill) portions of the shapes 212, 214 and portions of borders of the shapes that define continuous and enclosed areas within the user interface. The shape portion determination module 226 may then leverage the Bezier representation of the user input 208 to determine which portions 216, 218, 220 are overlapped by the user input 208.

The identified shape building operation is then performed using the identified at least one shape (block 310), a result of which is output in the user interface (block 312). In this way, a single user input drawn in a user interface may be used to identify a shape building operation and also a shape, shapes, and/or portions of the shapes involved as part of the shape building operation. Examples of shape building operations are further described in the following discussion and shown using corresponding figures.

Figure 4:
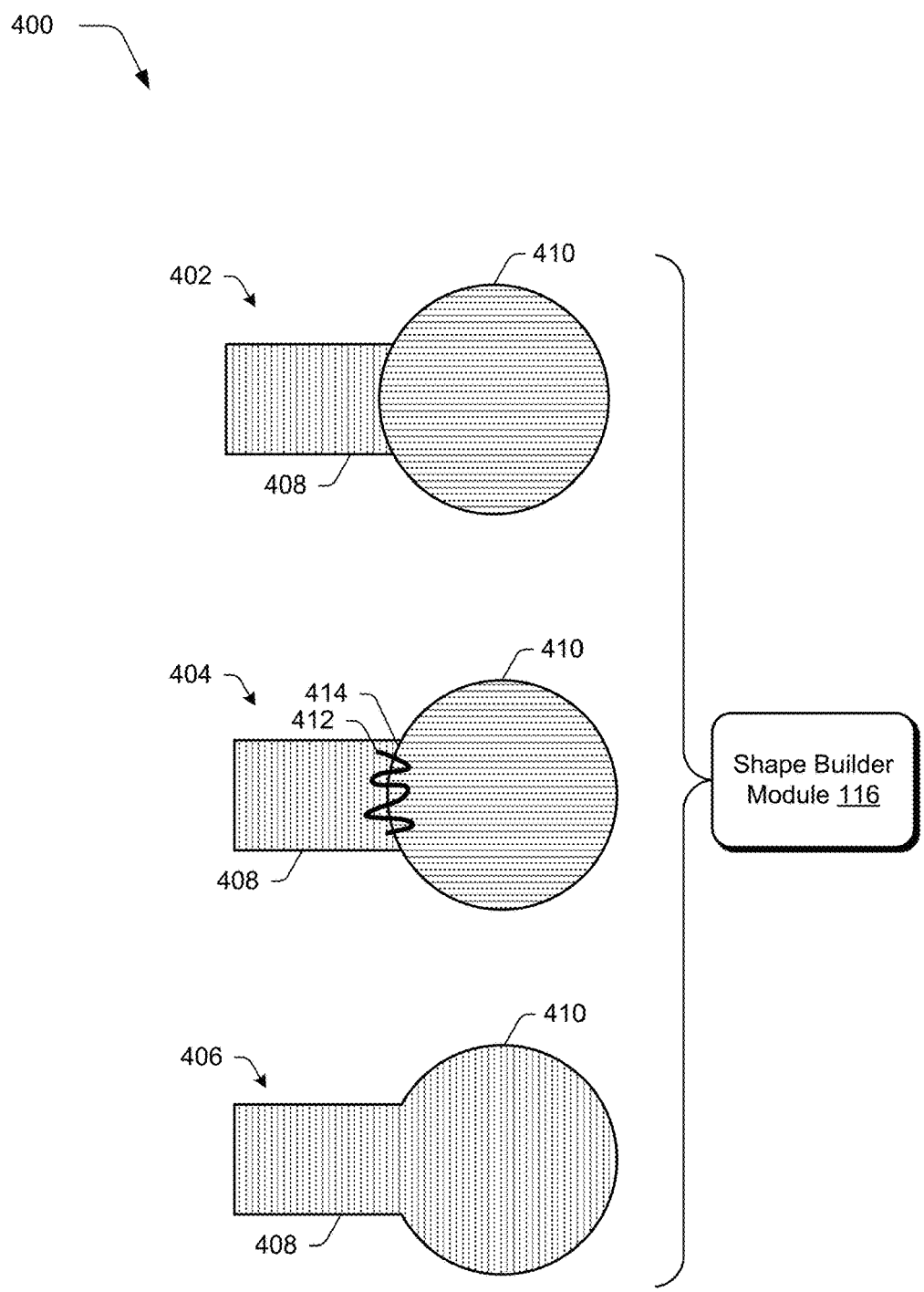
FIG. 4 depicts an example implementation in which a shape building operation is identified as a merge operation and used to merge an appearance of two shapes in a user interface by a shape builder module.

FIG. 4 depicts an example implementation 400 in which a shape building operation is identified as a merge operation and used to merge an appearance of two shapes in a user interface by a shape builder module 116. FIG. 4 is depicted using first, second, and third stages 402, 404, 406. At the first stage 402, first and second overlapping shapes 408, 410 are displayed in a user interface, which include a rectangle and a circle, respectively, that have different appearances, e.g., "fill."

At the second stage 404, a user input 412 is detected as a freeform line that begins within an interior (e.g., within a border) of the first shape 412 and crosses a portion of a border 414 to include an interior portion of the second shape 408. This user input 412, as illustrated, continues in this manner multiple times "back and forth" over the portion of the border 414 and within the interior portions of the shapes 408, 410.

From this, the shape builder module 116 identifies a merge operation 118 and causes an appearance of both the first and second shapes 408, 410 to match as shown at the third stage 406. This may include of use of matching patterns, fill, colors, borders, and so forth to form a single resulting shape. In the illustrated example, this includes removal of the portion of the border 414 that previously separated the two shapes 408, 410 from each other as well as to cause the second shape 410 to assume the appearance of the first shape 408. In this way, a user may directly interact with the first and second shapes 408, 410 in the user interface to both indicate a shape building operation and a shape that is a subject of the operation. The merge operation may also be performed for more than two shapes, an example of which is described as follows.

Figure 5:
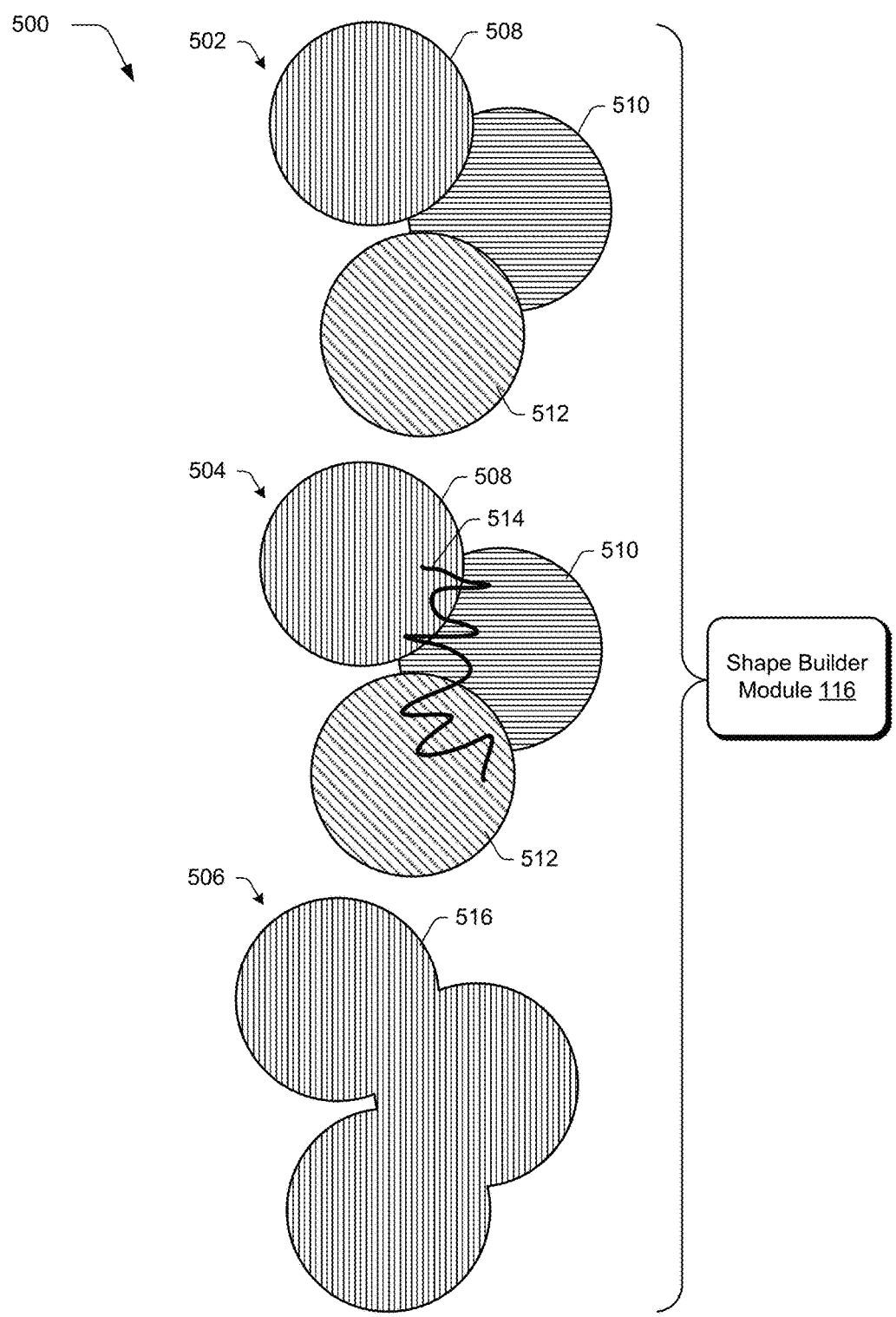
FIG. 5 depicts an example implementation in which a shape building operation is identified as a merge operation and used to merge an appearance of more than two shapes through use of a single user input.

FIG. 5 depicts an example implementation 500 in which a shape building operation is identified as a merge operation and used to merge an appearance of more than two shapes through use of a single user input. This example is also illustrated using first, second, and third stages 502, 504, 506. At the first stage 502, first, second, and third shapes 508, 510, 512 are displayed in a user interface. The first shape 508 overlaps the second shape 510 and the third shape 512 also overlaps the second shape 510.

A user input 514 is drawn within interior portions of the first, second, and third shapes 508, 510, 512 without crossing into an exterior of these shapes as shown at the second stage 504. Accordingly, the shape builder module 116 in this example also identifies a merge operation, performance of which results in formation of a single shape 516 having a common appearance, e.g., the border and fill match. As before, the common appearance may be based on which of the shapes 508, 510, 512 is associated with a starting point of the user input 510.

Figure 6:
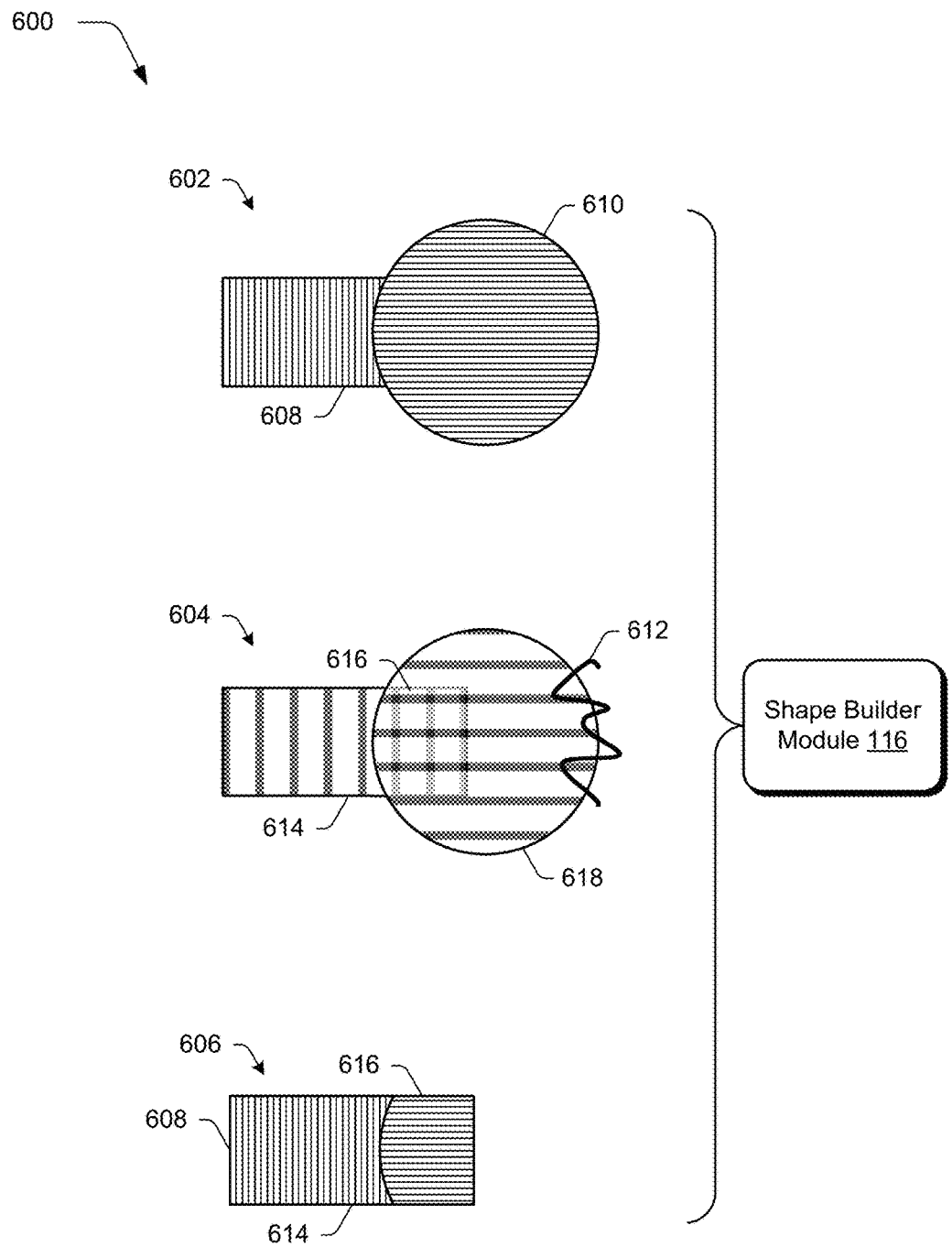
FIG. 6 depicts an example implementation in which a shape building operation is identified as a delete operation and used to delete a portion of a shape in a user interface by a shape builder module.

FIG. 6 depicts an example implementation 600 in which a shape building operation is identified as a delete operation and used to remove a portion of a shape in a user interface by a shape builder module 116. FIG. 6 is depicted using first, second, and third stages 602, 604, 606. At the first stage 602, a first shape 608 is displayed in a user interface along with a second shape 610, which overlaps the first shape 608.

At the second stage 604, a user input 612 is detected and identified by the shape builder module 116 as having at least a portion that is not disposed over any shape in the user interface, e.g., over a background of the user interface. From this, the shape builder module 116 identifies a delete operation. Identification of the delete operation then causes the shape builder module 116 to determine a shape or portions of a shape that are to be subject of the delete operation. For example, the shape builder module 116 segments the shapes 608, 610 into portions 614, 616, 618 based on overlap of the shapes 608, 610 with each other, which may or may not be displayed in the user interface. The shape builder module 116 also converts the user input 612 into a Bezier curve to determine which portions are disposed beneath the user input 612 in the user interface, which in this instance is portion 618.

Based on this relationship, the shape builder module 116 removes the portion 618 from the user interface but leaves the other portion 616 of shape 610 as well as an entirety of shape 608 in the user interface as shown at the third stage 606. In this way, the delete operation may be used to generate a shape that would be difficult using conventional preconfigured shapes and may do so in a simple and intuitive manner. The delete operation may also be performed for more than two shapes, an example of which is described as follows.

Figure 7:
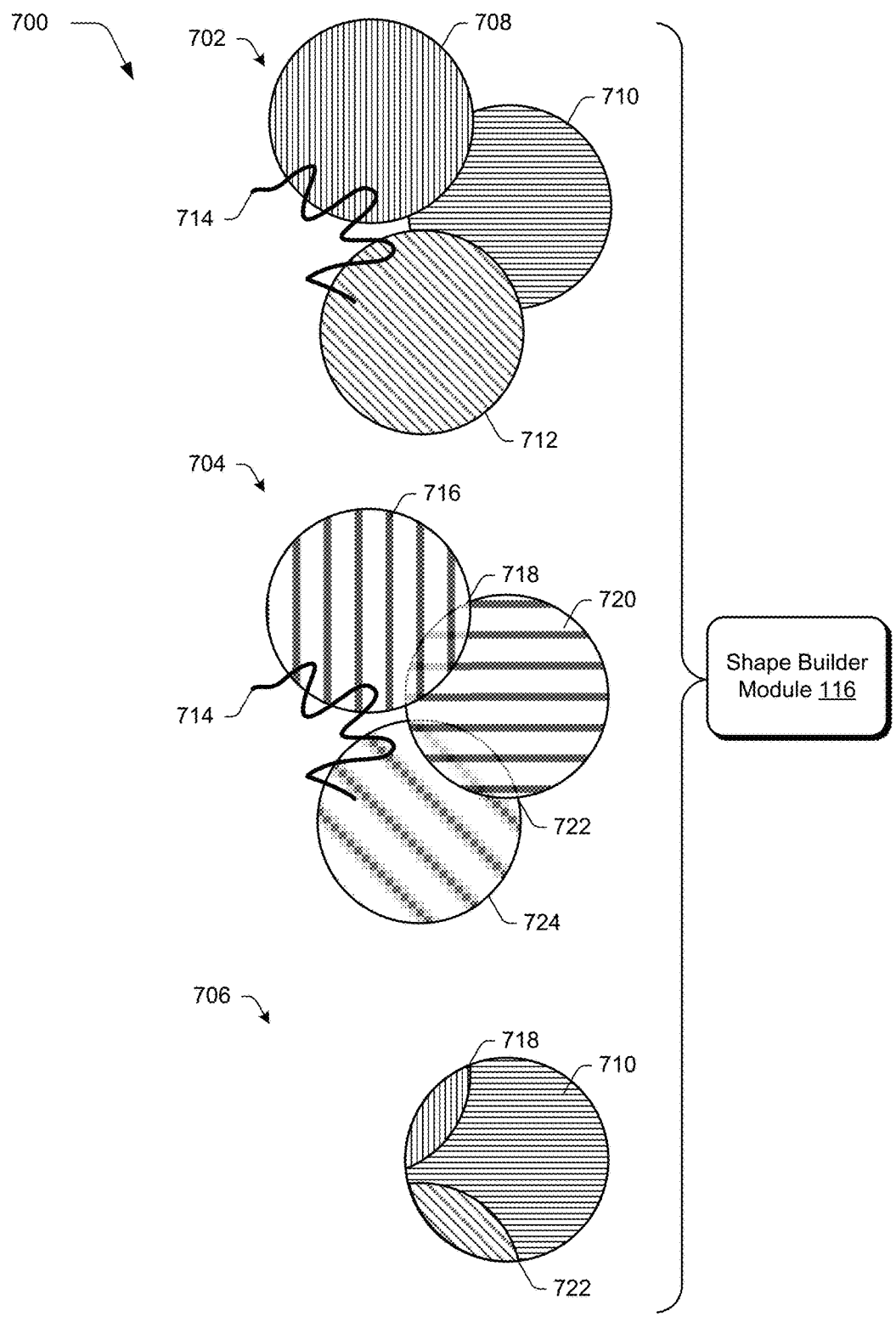
FIG. 7 depicts an example implementation in which a shape building operation is identified as a delete operation and used to delete portions of multiple shapes through use of a single user input.

FIG. 7 depicts an example implementation 700 in which a shape building operation is identified as a delete operation and used to delete portions of multiple shapes through use of a single user input. This example is also illustrated using first, second, and third stages 702, 704, 706. At the first stage 702, first, second, and third shapes 708, 710, 712 are displayed in a user interface. The first shape 708 overlaps the second shape 710 and the third shape 712 also overlaps the second shape 710. A user input 714 is also drawn as a freeform line that includes a portion exterior to the first, second, and third shapes 708, 710, 712, i.e., is not disposed, at least partially, over any shape in the user interface.

From this user input 714, the shape builder module 116 identifies a delete operation. Identification of the delete operation then causes the shape builder module 116 to determine a shape or portions of a shape that are to be subject of the delete operation as shown at the second stage 704. For example, the shape builder module 116 segments the shapes 708, 710, 712 into portions 716, 718, 720, 722, 724 based on overlap of the shapes 708, 710, 712 with each other as previously described. The shape builder module 116 also converts the user input 714 into a Bezier curve to determine which of the portions are overlapped by the user input 714, which in this instance includes portions 716, 724 from shapes 708, 712.

As shown at the third stage 706, the shape builder module 116 performs the delete operation to remove the portions 716, 718 from the user interface. The shape builder module 116 also leaves portions 718, 722 of respective shapes 708, 712 within the user interface that are not subject to the delete operation, along with an entirety of shape 710. Thus, a user may continue a single user input 714 to remove portions of multiple shapes in an efficient and intuitive manner.

Figure 8:
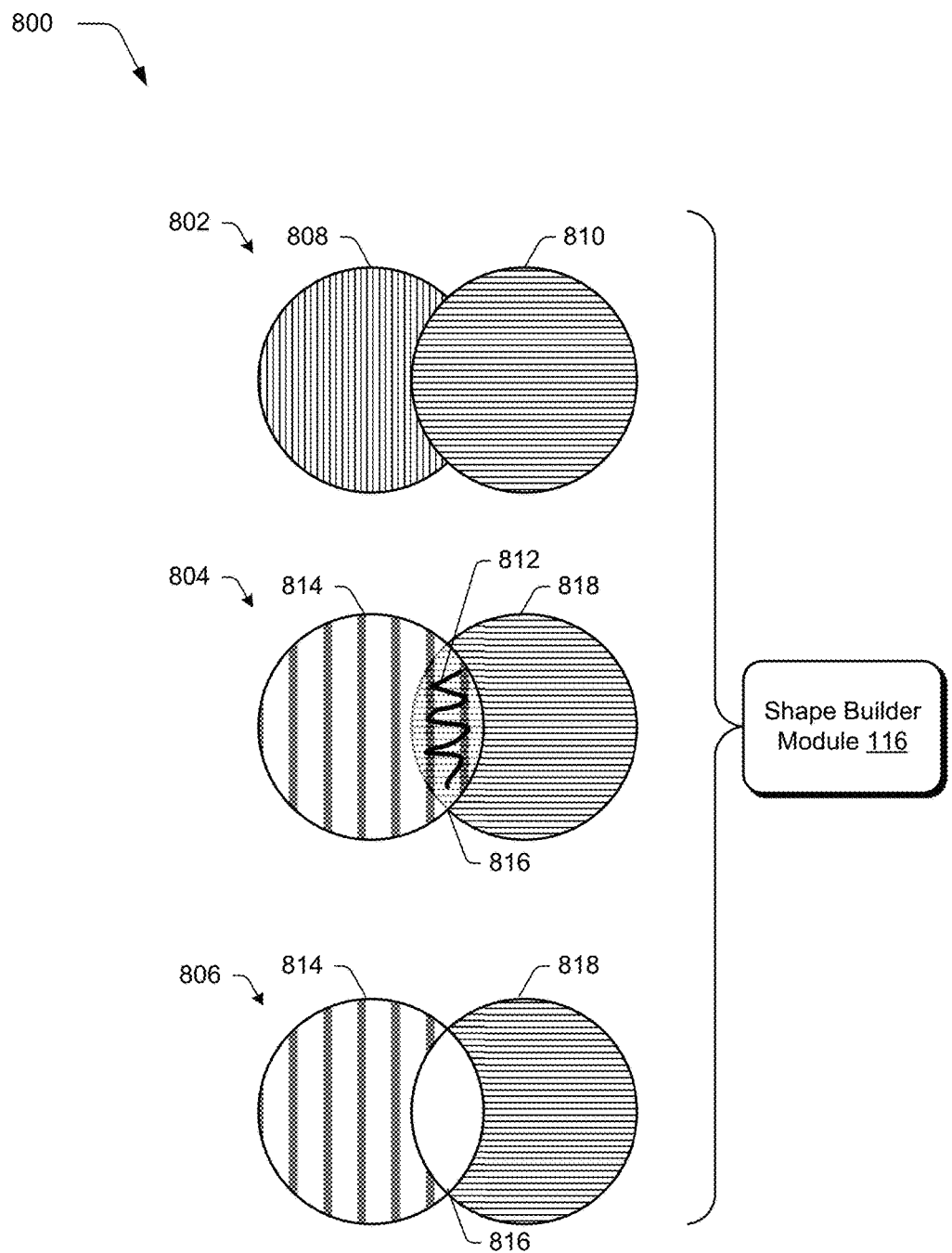
FIG. 8 depicts an example implementation in which a shape building operation is identified as a punch out operation and used to remove an interior portion of at least one shape from a user interface.

FIG. 8 depicts an example implementation 800 in which a shape building operation is identified as a punch out operation and used to remove an interior portion of at least one shape from a user interface. This operation is illustrated using first, second, and third stages 802, 804, 806. The punch out operation is used by the shape builder module 116 to remove an interior fill of all or a portion of a shape.

At the first stage 802, for instance, a first shape 808 and a second shape 808, 810 overlap each other in a user interface. At the second stage 804, a user input 812 is detected by the shape builder module 116 that is drawn entirely within a border of a shape. Thus, the user input does not cross a displayed border of any shape in the user interface nor include an area outside of a border of a shape, e.g., disposed over a background as in a delete operation.

From this, the shape builder module 116 identifies a punch out operation. This causes the shape builder module 116 to identify a shape or portion of the shape that is to be subject of the operation. Like the previous examples, the shape builder module 116 may segment the shapes 808, 810 based on overlap to define portions 814, 816, 818. The shape builder module 116 also converts the user input 812 into a Bezier curve and from this determines which of the portions 814, 816, 818 lie beneath the user input 812. In the illustrated example at the third stage 806, this causes the shape builder module 116 to remove the overlapping portions 816 of first and second shapes 808, 810 and leave the portions 814, 818 in the user interface. The punch out operation may also be used to remove a fill and leave a border of a corresponding portion, an example of which is described as follows and is shown in a corresponding figure.

Figure 9:
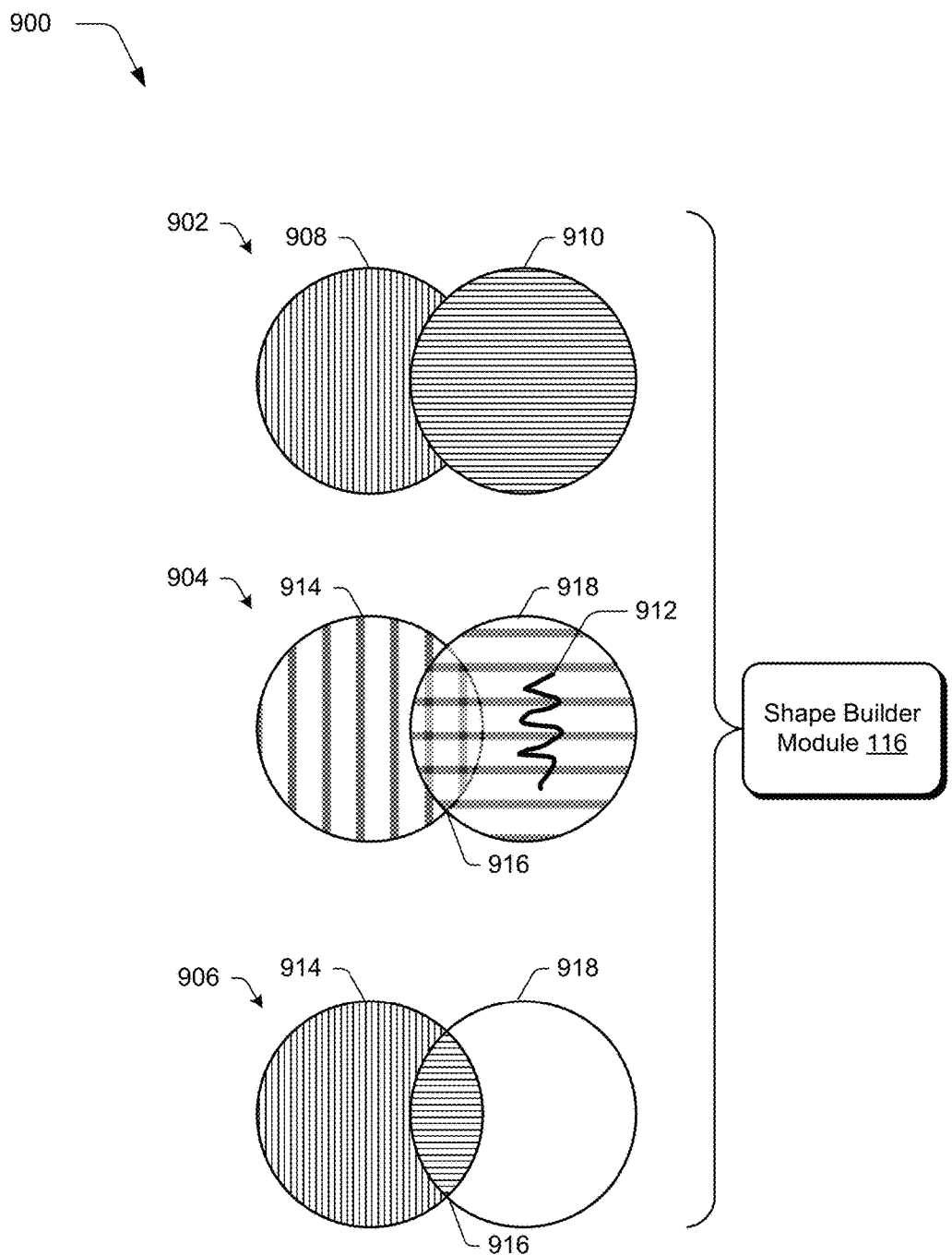
FIG. 9 also depicts an example implementation in which a shape building operation is identified as a punch out operation and used to remove an interior portion of at least one shape from a user interface.

FIG. 9 also depicts an example implementation 900 in which a shape building operation is identified as a punch out operation and used to remove an interior portion of at least one shape from a user interface. This operation is illustrated using first, second, and third stages 902, 904, 906. First and second shapes 908, 910 are also initially displayed in a user interface in this example. Like the previous example, a user input 912 is detected that is disposed entirely within a border of a shape 910.

From this, the shape builder module 116 identifies a punch out operation. This causes the shape builder module 116 to identify a shape or portion of the shape that is to be subject of the operation. Like the previous examples, the shape builder module 116 may segment the shapes 908, 910 based on overlap to define portions 914, 916, 918. The shape builder module 116 also converts the user input 912 into a Bezier curve and from this determines which of the portions 914, 916, 918 lie beneath the user input 912. In the illustrated example at the third stage 906, this causes the shape builder module 116 to remove an interior of portion 918 (i.e., the "fill") but leave a border of the portion 918 within the user interface. In this way, the punch out operation causes the shape builder module 116 to "punch out" an interior of a corresponding portion of the shape.

Figure 10:
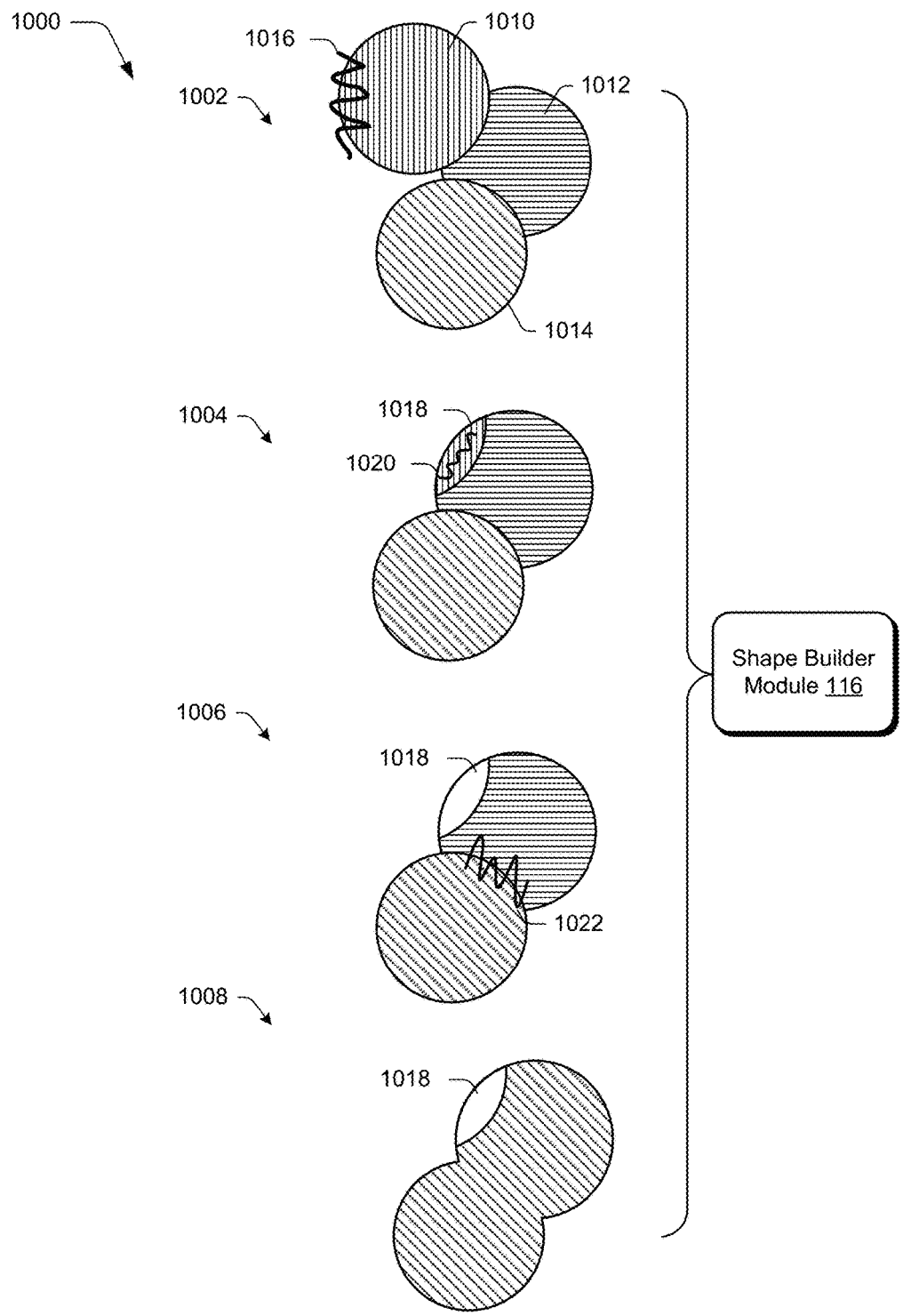
FIG. 10 depicts an example implementation in which maintenance of constituent shape definitions is used to support performance of a series of shape building operations.

FIG. 10 depicts an example implementation 1000 in which maintenance of constituent shape definitions is used to support performance of a series of shape building operations. This example implementation 1000 is illustrated using first, second, third, and fourth stages 1002, 1004, 1006, 1008. As previously described, conventional shape building operations resulted in a single shape definition and thus portions that may have been originally defined for the shapes separately were lost and thus not further modifiable as part of subsequent shape building operations. In the techniques described herein, however, the shape builder module 116 may maintain the definition of these portions to support application of additional shape building operations.

As shown at the first stage 1002, for instance, first, second, and third shapes 1010, 1012, 1014 are displayed in a user interface. A user input 1016 is received by the shape builder module 116 that is identified as a delete operation. This causes the shape builder module 116 to remove a non-overlapping portion of the first shape 1010 from the user interface and which causes an overlapping portion 1018 to remain as shown at the second stage 1004.

Another user input 1020 is then detected as being drawn entirely within that overlapping portion 1018. This user input 1020 is identified as a punch out operation which causes the shape builder module 116 to remove a fill from that portion and any other underlying shapes to expose a background of the user interface within a border of the portion 1018.

A further user input 1022 is also detected by the shape builder module 116 as a merge operation. This causes the shape builder module 116 to merge an appearance of shapes 1012 and 1014 together as shown at the fourth stage 1008, with the "punched out" portion 1018 remaining separate from the merged shape portions. Thus, the shape builder module 116 may support an efficient and intuitive technique to build complex shapes through direct user interaction within a user interface.

Example System and Device

Figure 11:
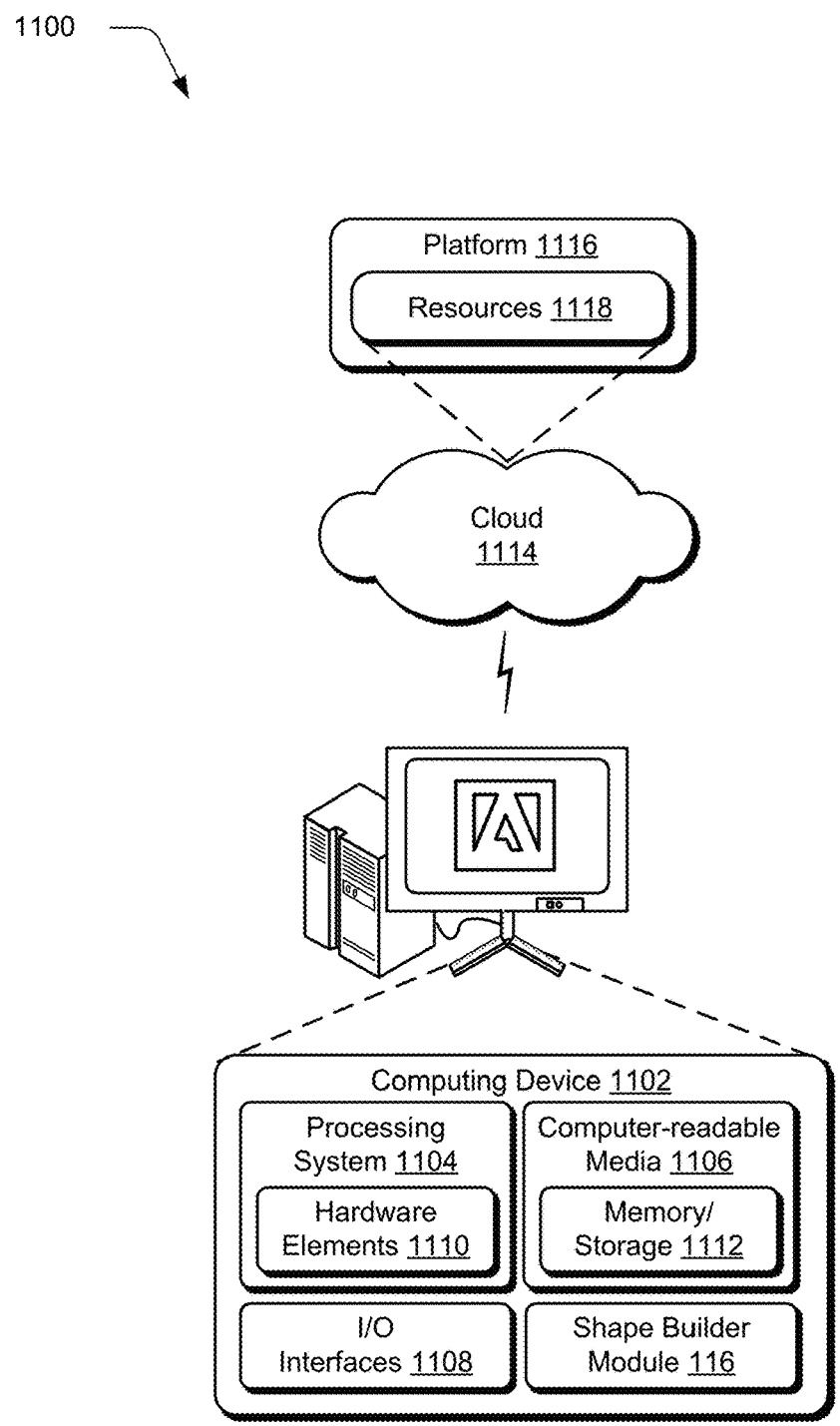
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the shape builder module 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a shape building digital medium environment, a method implemented by at least one computing device, the method comprising:
   detecting, by the at least one computing device, a locational relationship of a single user input as drawn within a user interface with respect to at least one shape displayed within the user interface;

based on the locational relationship of the single user input with respect to the at least one shape, determining both a shape building operation of a plurality of shape building operations is to be performed and that the at least one shape is subject to the determined shape building operation;

performing, by the at least one computing device, the identified shape building operation on the determined at least one shape; and outputting, by the at least one computing device, a result of the performing in the user interface.

2. The method as described in claim 1, wherein the single user input is drawn as a freeform line and detected as a gesture or through use of cursor control device by the at least one computing device.

3. The method as described in claim 1, wherein:
the locational relationship indicates that part of the single user input includes a portion of a border of the at least one shape that intersects another shape in the user interface;
the determined shape building operation from the locational relationship is a merge operation; and
the performing of the merge operation includes unifying an appearance of the at least one shape and the other shape.

4. The method as described in claim 3, wherein the performing of the merge operation further comprises removing the portion of the border from the user interface.

5. The method as described in claim 1, wherein:
the locational relationship indicates that part of the user input as drawn includes at least one portion of the at least one shape and an exterior of the at least one shape that is not disposed over any other shape in the user interface;
the determined shape building operation from the locational relationship is a delete operation; and
the performing of the delete operation includes removing the at least one portion from the user interface.

6. The method as described in claim 5, wherein the determining further comprises determining from the locational relationship that at least one other portion of the at least one shape is not subject to the delete operation and the performing of the delete operation removes the at least one portion but not the at least one other portion.

7. The method as described in claim 1, wherein:
the relationship indicates that an entirety of the single user input is disposed within at least one portion of the at least one shape in the user interface;
the identified shape building operation from the locational relationship is a punch out operation; and
the performing of the punch out operation includes removing the at least one portion from the user interface.

8. The method as described in claim 7, wherein the determining further comprises determining from the locational relationship that at least one other portion of the at least one shape is not subject to the punch output operation and the performing of the punch out operation includes removing the at least one portion but not the at least one other portion from the user interface.

9. The method as described in claim 1, wherein the determining further comprises determining at least one portion of the at least one shape that is subject to the determined shape building operation based on the locational relationship and the performing includes performing the determined shape building operation using the at least one portion.

10. The method as described in claim 9, wherein the determining further comprises determining at least one other portion of the at least one shape that is not subject to the identified shape building operation based on the locational relationship and the performing of the identified shape building operation does not include the at least one other portion.

11. The method as described in claim 10, wherein the at least one portion and the at least one other portion are defined as least partially through intersection of the at least one shape and at least one other shape as constituent shapes defined in the user interface.

12. In a shape building digital medium environment, a system comprising:
an operation identification module implemented at least partially in hardware of a computing device to identify which shape building operation of a plurality of shape building operations is to be performed based on a locational relationship of a single user input as drawn within a user interface with respect to at least one shape displayed within the user interface;
a shape determination module implemented at least partially in hardware of the computing device to determine that the at least one shape is subject to the identified shape building operation based on the locational relationship of the single user input as drawn within the user interface with respect to the at least one shape; and
an operation manager module implemented at least partially in hardware of the computing device to perform the identified shape building operation on the identified at least one shape.

13. The system as described in claim 12, wherein:
the locational relationship indicates that part of the single user input includes a portion of a border of the at least one shape that intersects another shape in the user interface;
the identified shape building operation from the locational relationship is a merge operation; and
the operation manager module is configured to perform the merge operation to cause the at least one shape and the other shape to have a unified appearance.

14. The system as described in claim 12, wherein:
the locational relationship indicates that part of the single user input as drawn includes at least one portion of the at least one shape and an exterior of the at least one shape that is not disposed over any other shape in the user interface;
the identified shape building operation from the locational relationship is a delete operation; and
the operation manager module is configured to perform the delete operation to cause at least one portion of the at least one shape associated with the single user input to be removed from the user interface.

15. The system as described in claim 12, wherein:
the locational relationship indicates that an entirety of the single user input is disposed within at least one portion of the at least one shape in the user interface;
the identified shape building operation from the relationship is a punch out operation; and
the operation manager module is configured to perform the punch out operation to cause the at least one portion to be deleted from the user interface.

16. The system as described in claim 12, further comprising a shape portion determination module implemented at least partially in hardware to determine at least one portion of the at least one shape that is subject to the identified shape building operation based on the locational relationship and the operation manager module is configured to perform of the identified shape building operation using the at least one portion.

17. The system as described in claim 16, wherein the shape portion determination module is further configured to determine at least one other portion of the at least one shape that is not subject to the identified shape building operation based on the relationship and the operation manager module is configured such that the identified shape building operation is not performed using the at least one other portion.

18. The system as described in claim 17, wherein the shape portion determination module is configured to identify the at least one portion and the at least one other portion through intersection of the at least one shape and the at least one other shape as constituent shapes.

19. In a shape building digital medium environment, a system comprising:

means for detecting a locational relationship of a single user input as drawn within a user interface with respect to at least one shape displayed within the user interface;

means for identifying which shape building operation of a plurality of shape building operations is to be performed based on the locational relationship of the single user input as drawn within the user interface with respect to the at least one shape displayed within the user interface;

means for determining the at least one shape is subject to the identified shape building operation based on the relationship;

means for determining at least one portion of the at least one shape that is subject to the identified shape building operation based on the relationship; and means for performing the identified shape building operation on the at least one portion of the at least one identified shape.

20. The system as described in claim 19, wherein the single user input is drawn as a freeform line.

* * * * *

UNITED STATES PATENT AND TRADEMARK OFFICE
CERTIFICATE OF CORRECTION

PATENT NO. : 10,460,481 B2  
APPLICATION NO. : 15/349833  
DATED : October 29, 2019  
INVENTOR(S) : Avadhesh Kumar Sharma, Ankit Phogat and Akhil Jindal Page 1 of 1

It is certified that error appears in the above-identified patent and that said Letters Patent is hereby corrected as shown below:

In the Claims

Column 15, Line 4, after "building operations", delete "is", therefor.

Signed and Sealed this  
Thirty-first Day of December, 2019

Andrei Iancu  
*Director of the United States Patent and Trademark Office*